United States Patent [19]

Tar et al.

[11] Patent Number: 6,077,183
[45] Date of Patent: Jun. 20, 2000

[54] DIFFERENTIAL LOCK-UP ASSEMBLY FOR VEHICLES

[75] Inventors: Lorant Tar; Andor Opitz, both of Gyor, Hungary

[73] Assignee: Raba Magyar Vagon- es Gepgyar Rt., Gyor, Hungary

[21] Appl. No.: 09/354,096

[22] Filed: Jul. 15, 1999

[30] Foreign Application Priority Data

Jul. 15, 1998 [HU] Hungary .................................. 9801582

[51] Int. Cl.$^7$ ................................................. F16H 48/22
[52] U.S. Cl. ............................................................ 475/231
[58] Field of Search ..................................... 475/146, 231

[56] References Cited

U.S. PATENT DOCUMENTS

| 5,445,574 | 8/1995 | Sekiguchi et al. | 475/231 |
| 5,520,589 | 5/1996 | Dewald et al. | 475/231 |
| 5,582,557 | 12/1996 | Dissett et al. | 475/231 |

*Primary Examiner*—Dirk Wright
*Attorney, Agent, or Firm*—Young & Thompson

[57] ABSTRACT

A differential lock-up assembly for vehicles with a differential gear set has a main drive housing, a driving pinion gear being rotatable in the main drive housing, a ring gear engaging the pinion gear, a planet carrier secured to the ring gear and rotatably supported in the main drive housing, a set of pinion gears journalled in the planet carrier and a set of bevel gears engaging the pinion gears and journalled in the planet carrier and engaged to output shafts of the differential gear set, and a lockout clutch assembly with a pack of interleaved discs locking the planet carrier to one of the output shafts on the impact of pressurized fluid with the intermediation of a piston and cylinder assembly.

The improvement achieved by this invention is that a cylinder of the piston and cylinder assembly is arranged concentrically around a cylindrical extension of the planet carrier and is supported in the main drive housing by loose fitting, and the piston is split into a first piston and a second piston, one piston of which is rotatably arranged around said cylindrical extension of the planet carrier, and one of the pistons is engaged with the discs of the lockout clutch assembly and the other piston is supported axially to counteract its motion in opposite direction to the discs, and the pistons and the cylinder are disposable to each other in axial direction but fixed to each other against radial movement and they are sealed against each other, and the pressurized fluid is introduced into a sealed pressure chamber provided between the pistons and the cylinder.

8 Claims, 3 Drawing Sheets

DIFFERENTIAL LOCK-UP ASSEMBLY FOR VEHICLES

BACKGROUND OF THE INVENTION

1. Field of the Invention

The invention relates to a differential lock-up assembly for vehicles with a differential gear set which has a main drive housing, a driving pinion gear being rotatable in the main drive housing, a ring gear engaging the pinion gear, a planet carrier secured to the ring gear and rotatably supported in the main drive housing, a set of pinion gears journalled in the planet carrier and a set of bevel gears engaging the pinion gears and journalled in the planet carrier and engaged to output shafts of the differential gear set, and a lockout clutch assembly with a pack of interleaved discs locking the planet carrier to one of the output shafts on the impact of pressurised fluid with the intermediation of a piston and cylinder assembly.

2. Description of the Related Art

It is quite well known in the prior art (see e. g. GB Patent Specification No. 687,341) to provide a differential gear in a vehicle and a differential lock to be able to lock the driven wheels of the vehicle together and, thus, to put the differential gear out of action. The lock-up assembly includes a hydraulic mechanism with a source of pressurised fluid actuating a clutch with a pack of interleaved discs. The hydraulic mechanism has a rotating cylinder and a piston therein whilst the pressurised fluid is introduced from a standing inlet ring into a bore of rotating disc communicating with the pressure chamber of the cylinder. The clutch is outside the bearing base of the ring gear deteriorating the support capacity of the bearing assembly of the ring gear of the differential gear assembly. Therefore, more sophisticated and expensive bearing assembly is necessary as well as an auxiliary back support for the ring gear. Further, the rotating introduction of the pressurised fluid can be put under pressure only at an extremely low rotational speed and the pressure applied cannot reach the value as required for a secure locking operation. The pack of discs are arranged in a closed space, thus, the heat produced by the friction of the discs cannot be led away from the pack of discs.

U.S. Pat. No. 3,605,965 describes a differential lock-up assembly with the conventional parts of differential gear set and a lockout clutch assembly with hydraulic actuation, wherein the rotating pack of discs are to be compressed by a still-standing piston with the intermediation of a simple bearing washer which is exposed to extremely high wear when the pressure necessary for reliable compression of the discs is applied. Further, the discs are mounted through the inner diameter of the bearing assembly of the planet carrier which delimits the measurements of the discs and, as a result, the loadability of these discs. There is an antagonism between the smallest possible diameter of the bearing and the biggest possible outer diameter of the discs. The reaction force of the piston of the hydraulic actuator is led through the discs to the bearing assembly at the other output shaft enlarging the load on it during the whole locking operation. The load is than transmitted onto the main drive housing resulting a deformation of the seat of the bearing. On the other side of the piston, the reaction force of the cylinder is also transmitted onto the main drive housing further deforming it. This deteriorates the running accuracy of the revolving parts. The pack of discs is in a closed space, too, and the dissipation of heat produced between the discs is not possible at all.

In summary, the previously known solutions providing differential gear lock-up operation are quite complicated and they are not suitable for applications under heavy duty conditions with the necessary reliability and duration but, as mentioned above, the need to overcome these disadvantages is quite urgent.

SUMMARY OF THE INVENTION

The main objective of the present invention is to provide a differential lock-up assembly for the differential gear set of vehicles wherein the advantages of the hydraulic actuation can be preserved with heavy duty vehicles as well without increase of complexity, production and operation costs and decrease of duration, load bearing capacity and reliability.

The basic idea of this invention is to relieve the bearing assemblies, the planet carrier and the main drive housing from the surplus load resulting from the reaction forces of the compression of the discs of the lockout clutch assembly.

Hence, according to the invention, a differential lock-up assembly for vehicles with a differential gear set has a main drive housing, a driving pinion gear being rotatable in the main drive housing, a ring gear engaging the pinion gear, a planet carrier secured to the ring gear and rotatably supported in the main drive housing, a set of pinion gears journalled in the planet carrier and a set of bevel gears engaging the pinion gears and journalled in the planet carrier and engaged to output shafts of the differential gear set, and a lockout clutch assembly with a pack of interleaved discs locking the planet carrier to one of the output shafts on the impact of pressurised fluid with the intermediation of a piston and cylinder assembly.

The improvement is in that the cylinder is arranged concentrically around a cylindrical extension of the planet carrier and is supported in the main drive housing by loose fitting, and the piston is split into a first piston and a second piston, one piston of which is rotatably arranged around said cylindrical extension of the planet carrier, and one of the pistons is engaged with the discs of the lockout clutch assembly and the other piston is supported axially to counteract its motion in opposite direction to the discs, and the pistons and the cylinder are disposable to each other in axial direction but fixed to each other against radial movement and they are sealed against each other, and the pressurised fluid is introduced into a sealed pressure chamber provided between the pistons and the cylinder.

Various optional or preferred features are set out in the detailed description forming part of this specification.

Thus, in one exemplified embodiment of this invention, the pack of interleaved discs of the lockout clutch assembly is arranged between the planet carrier and one of the of bevel gears, and the discs are alternately splined to the planet carrier and to said bevel gear, and the discs when compressed are supported axially on the planet carrier. Therein, the piston compressing the discs may be connected to an axially disposable pressure ring by an axial roller bearing ring, and the pressure ring may abut with bolts penetrating through the planet carrier on the discs, and around at least on of the bolts, a slightly pre-stressed helical spring may be arranged.

It is also preferred, according to the invention, that the cylinder is supported in the main drive housing by a support rod sealingly fixed in a side bore of the cylinder in a pre-determined position, and the side bore is perpendicular to the middle bore of the cylinder inhousing the pistons, and the support rod penetrates through the main drive housing in a sealed manner, and the support rod contains a first longitudinal bore communicating pressurised fluid into the pressure chamber between the pistons and a second longitudinal bore letting air out of the pressure chamber.

A further preferred embodiment is wherein the first piston is arranged around said cylindrical extension of the planet carrier by a gliding bearing and it is axially lying against the axial roller bearing ring. Therein, the second piston may lye against an outer ring of a roller bearing between the main drive housing and the planet carrier.

It is still another preferred embodiment, wherein the first piston is axially lying against the axial roller bearing ring and is sealingly disposable on an outer annular surface of the second piston, and the second piston is axially supported by an axial roller bearing assembly against an inner ring of a roller bearing between the main drive housing and the planet carrier and is radially supported by a radial roller bearing assembly against said cylindrical extension of the planet carrier, whereas said inner ring of the roller bearing is fixed against the planet carrier. Most preferably, the axial and radial roller surfaces for the axial roller bearing assembly and the radial roller bearing assembly, respectively, may be provided on an annular member tightly fixed on the planet carrier.

BRIEF DESCRIPTION OF THE DRAWINGS

Embodiments of this invention will now be described by way of example with reference to the accompanying drawings, in which.

DETAILED DESCRIPTION OF THE PREFERRED EMBODIMENTS

Figure 1:
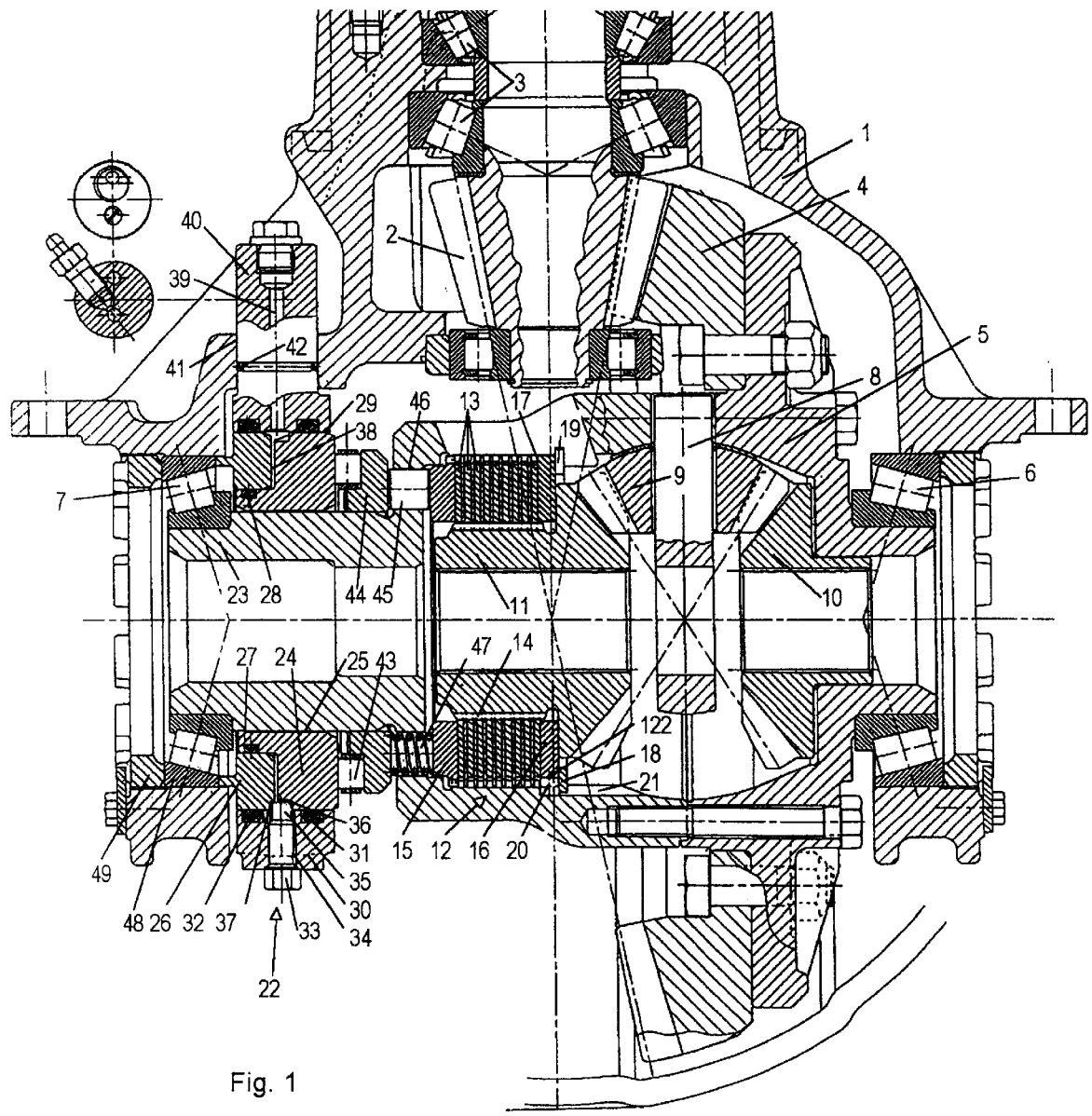
FIG. 1 illustrates a preferred embodiment of a differential gear with the lock-up assembly as in this invention in cross sectional view.

FIG. 1 shows the partial cross section of a conventional differential gear set as used with vehicles. In a main drive housing 1, a pinion gear 2 introducing the driving rotational movement into the differential gear set is mounted in roller bearing assemblies 3. A ring gear 4 engages pinion gear 2 and is secured to a planet carrier 5. The planet carrier 5, in turn, is rotationally mounted in main drive housing 1 by roller bearing assemblies 6 and 7 on both sides at the output ends of the differential gear set. In the planet carrier 5, a pinion shaft 8 is provided on which a pinion gear 9 is journalled. In engagement with pinion gear 9, a first bevel gear 10 and a second bevel gear 11 are journalled in planet carrier 5 and bevel gears 10, 11 are splined to output shafts (not shown) towards the driven wheels (not shown) of the vehicle.

The planet carrier 5 may be locked to one of the output shafts to put the differential gear out of action. For this purpose, a lockout clutch 12 is provided between the planet carrier 5 and bevel gear 11 splined to the output shaft on this side. The lockout clutch 12 includes a pack of interleaved discs 13 alternately splined to planet carrier 5 and to an outer splined surface 14 of bevel gear 11. An annular follower block 15 is splined to planet carrier 5 to move axially only on surface 14 into engagement with discs 13 for the lockout clutch 12. On the other side of the pack of discs 13, a support disc 16 is stationarily arranged against rotational and axial movements as well. For this, support disc 16 abuts on an end surface of the splines of surface 14 and, on the other side, on a fixing ring 18 snapped into a circular groove 19 machined into planet carrier 5. Fixing ring 18 is secured against tangential movement by a roller 20 sitting partially in a semi-cylindrical axial groove of planet carrier 5 and partially in a semi-cylindrical seat 122 of fixing ring 18.

Actuation of lockout clutch 12 is provided by a hydraulic piston and cylinder assembly 22 provided around an axial and cylindrical extension 23 circumferencing the output shaft (not shown) splined to bevel gear 11. In the hydraulic piston and cylinder assembly 22, the piston is split into two portions: a first piston 24 is rotational around said cylindrical extension 23 by a gliding bearing 25. Second piston 26 sits in axially disposable manner on an outer flange 27 of first piston 24 sealed by an O-ring 28. The equal outer diameters of pistons 24 and 26 fit into a central bore 29 of a cylinder 30. The pistons 24 and 26 are sealed against cylinder 30 by O-rings 31 and 32, respectively.

As mentioned earlier, pistons 24 and 26 may be disposed in respect of cylinder 30 and main drive housing 1 only in axial direction. Therefore, a screw 33 is received in a threaded bore 34 of cylinder 30. An end portion 35 of the screw 33 engages with a seat 36 of first piston 24 and a seat 37 of second piston 26. The seats 36, 37 are not wider than the diameter of end portion 35 but their overall length is somewhat greater than this diameter. Delimited by pistons 24 and 26, cylinder 30 and O-rings 28, 31 and 32, a closed pressure chamber 38 is provided into which the pressurised fluid is introduced through a bore 39 provided in a support rod 40 of cylinder 30 penetrating through a bore 41 out of main drive housing 1. In this example, the support rod 40 is made of one piece with the cylinder 30. The inner oil chamber of main drive housing 1 is sealed against the outword by an O-ring 42 in bore 41.

On an outer axial surface of piston 24, an axial roller bearing ring 43 is mounted lying against an axially disposable pressure ring 44. Between follower block 15 and pressure ring 44, bolts 45 are arranged in respective through-bores 46 of planet carrier 5. Around at least one of the bolts 45, a slightly pre-stressed helical spring 47 is arranged.

On the other side of the piston and cylinder assembly 22, piston 26 abuts on an outer ring 48 of roller bearing assembly 7. The ring 48 is held in place by a bearing backup nut 49 threaded in main drive housing 1.

In operation, pressurised fluid is introduced through bore 39 into pressure chamber 38. Piston 24 moves away from piston 26 and roller bearing ring 43 urges pressure ring 44 against bolts 45 to press follower block 15. Thus, discs 13 delimited in displacement by support disc 16 get compressed and, as a result, the relative rotational difference between planet carrier 5 and bevel gear 11 will be eliminated: the planet carrier 5 gets locked to the output shaft splined in bevel gear 11. With this, the rotational speeds of bevel gears 10 and 11 get equal, the wheels of the vehicle are forced to rotate uniformly.

The reaction force is led on one hand from piston 26 through outer ring 48 directly to main drive housing 1 without any additional load on roller bearing assembly 7. On the other, the reaction force of the lockout clutch 12 impacts by fixing ring 18 directly on planet carrier 5 far away from roller bearing assembly 7 or any other constructional part being sensitive to eventual deformations.

Piston 24 runs at gliding bearing 25 in a quite loose manner on planet carrier 5, and support rod 40 is angularly and longitudinally displaceable in bore 41. This results in a swimming suspension of the piston and cylinder assembly 22 which is able to follow and take up all inaccuracies of the constructional parts without the risk of getting stuck.

The slightly pre-stressed helical spring 47 provides the secure running of roller bearing 43 as well as the readiness to locking operation under all operational conditions.

Figure 2:
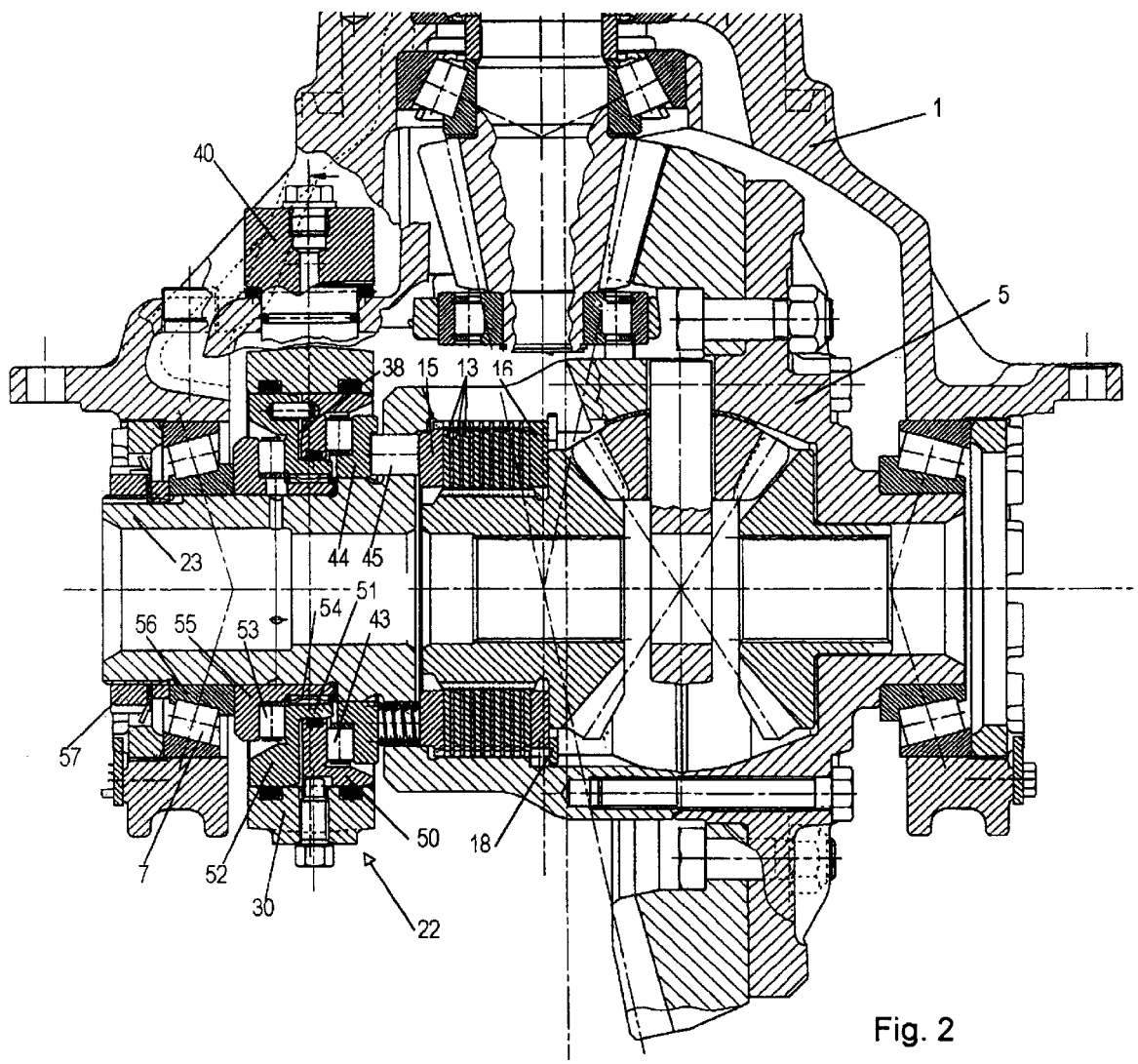
FIG. 2 is a same view as in FIG. 1, however for another exemplified embodiment.

FIG. 2 shows basically the same differential gear and differential lock-up assembly but the piston and cylinder assembly 22 differs from the previous one in this example. A first piston 50 is sliding on an outer flange 51 of a second piston 52 and engages roller bearing 43. Second piston 52 is axially supported by an axial roller bearing assembly 53 and is radially supported by a radial roller bearing assembly 54. Axial and radial roller surfaces for the axial roller bearing assembly 53 and the radial roller bearing assembly 54, respectively, are provided on an annular member 55 tightly fixed on extension 23 of planet carrier 5. Annular member 55 abuts now on an inner ring 56 of roller bearing assembly 7 which is held in place by a bearing backup nut 57.

Operation of this embodiment is basically the same as that of the previous one. Constructional inaccuracies and those resulting from the production and distortions under load are taken up in a secure manner by axial and radial roller bearing assemblies 53, 54 maintaining the swimming suspension of the piston and cylinder assembly 22 as mentioned earlier.

More importantly, however, in this embodiment, the axial reaction force of the piston and cylinder assembly 22 is given from piston 52 through axial roller bearing assembly 53, annular member 55 and inner ring 56 to planet carrier 5 on one side, and from piston 50 through roller bearing assembly 43, pressure ring 44, bolts 45, follower block 15, discs 13, support disc 16 and fixing ring 18 to the same planet carrier 5, on the other. Thus, the flux of forces is short cut in the same member without having the slightest impact on any other constructional part of the differential lock-up assembly or the differential gear itself.

Figure 3:
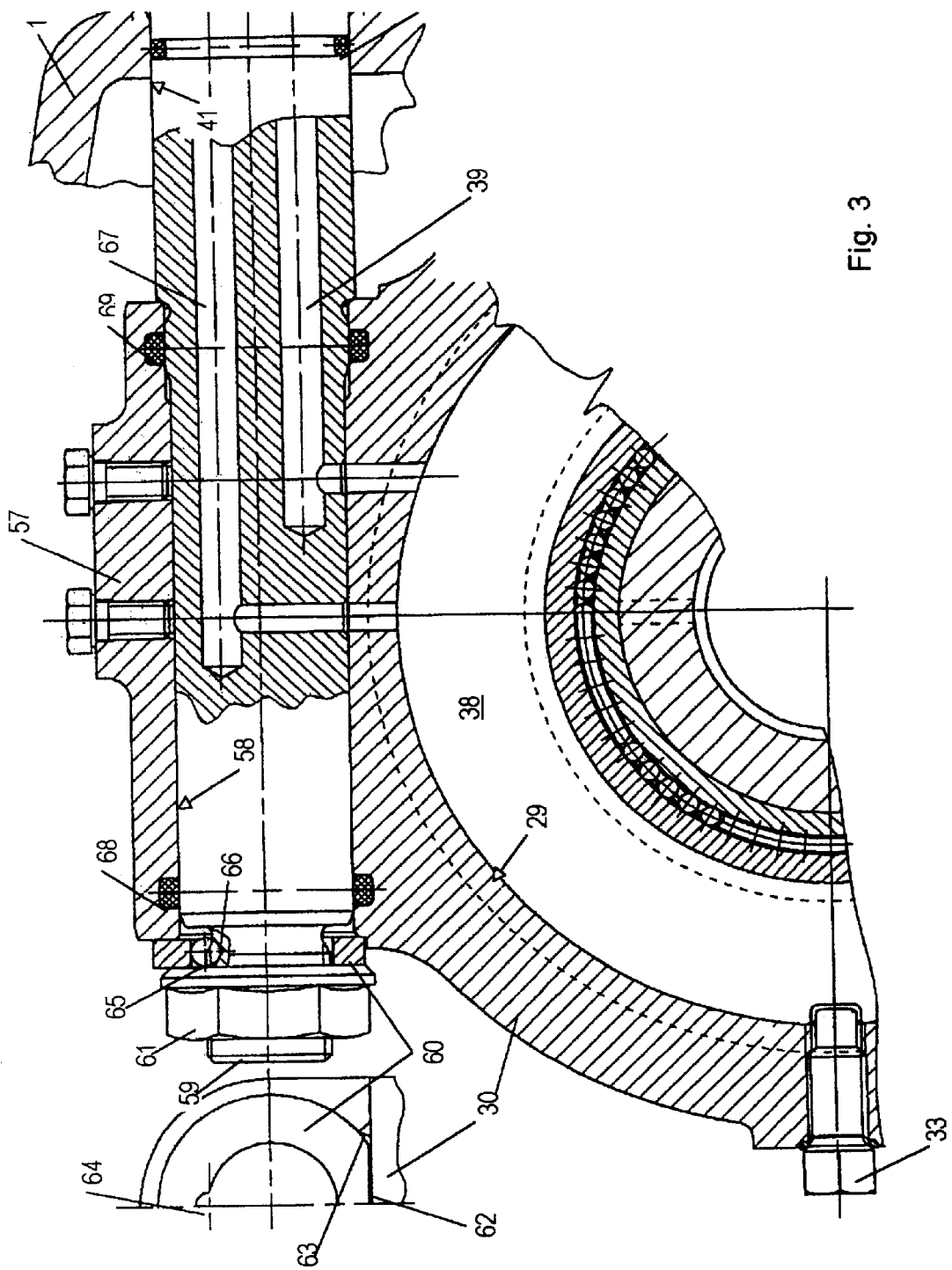
FIG. 3 is a part of an embodiment in a cross sectional view taken perpendicularly to that of FIG. 2.

The support rod 40 is formed in this example as a separate piece as best shown in FIG. 3. For this purpose, the cylinder 30 has an enlarged side portion 57 into which a side bore 58 is machined. Bore 41 in main drive housing 1 is coaxial with side bore 58. Support rod 40 is pushed through bore 41 and side bore 58, and it is fixed there in a pre-determined position. For this, support rod 40 has a threaded end portion 59 onto which a positioning washer 60 and a nut 61 is attached. The washer 60 has a cut surface 62 engaging a seat 63 in the cylinder 30 and a semi-circular seat 64 partially occupied by a ball 65 sitting partially in a corresponding seat 66 formed in support rod 40. The pre-determined position is taken and secured when all parts sit in their final positions and the nut 61 can be tightened as required.

Support rod 40 contains first longitudinal bore 39 communicating pressurised fluid into the pressure chamber 38 and a parallel second longitudinal bore 67 letting air out of the pressure chamber 38. Support rod 40 is sealed in side bore 58 at O-rings 68 and 69.

Support rod 40 secures the well defined position of the whole piston and cylinder assembly 22 and counteracts to the forces tending to turn the assembly 22. The pressurised fluid is led securely to the pressure chamber 38, additional conduits are not required.

The most important advantage is apparent in the closed circle of flux of forces without any loading or deforming contribution to the roller bearing assemblies 6, 7, to the teethed or splined connections. The heat dissipation from among the discs 13 is effectively provided by a strong oil stream washing through the pack of discs 13 during the whole operation. Further, the dimensions of the lockout clutch is independent from any other constructional part. Thus, in case of extremely low fluid pressure or high loads, the piston and cylinder assembly 22 can be enlarged and/or the lockout clutch 12 can be dimensioned as required to secure the necessary compression value and friction between the discs 13. The invention, however, utilises all previous constructional solutions providing a well-known and reliable hydraulic actuation even with heavy duty vehicles as well.

What is claimed is:

1. Differential lock-up assembly for vehicles with a differential gear set having a main drive housing,
    a driving pinion gear being rotatable in the main drive housing,
    a ring gear engaging the pinion gear, a planet carrier secured to the ring gear and rotatably supported in the main drive housing,
    a set of pinion gears journalled in the planet carrier and a set of bevel gears engaging the pinion gears and journalled in the planet carrier and engaged to output shafts of the differential gear set,
    and a lockout clutch assembly with a pack of interleaved discs locking the planet carrier to one of the output shafts on the impact of pressurised fluid with the intermediation of a piston and cylinder assembly,
characterised by that a cylinder of the piston and cylinder assembly is arranged concentrically around a cylindrical extension of the planet carrier and is supported in the main drive housing by loose fitting, and the piston is split into a first piston and a second piston, one piston of which is rotatably arranged around said cylindrical extension of the planet carrier, and one of the pistons is engaged with the discs of the lockout clutch assembly and the other piston is supported axially to counteract its motion in opposite direction to the discs, and the pistons and the cylinder are disposable to each other in axial direction but fixed to each other against radial movement and they are sealed against each other, and the pressurised fluid is introduced into a sealed pressure chamber provided between the pistons and the cylinder.

2. Lock-up assembly as claimed in claim 1, wherein the pack of interleaved discs of the lockout clutch assembly is arranged between the planet carrier and one of the bevel gears, and the discs are alternately splined to the planet carrier and to said bevel gear, and the discs when compressed are supported axially on the planet carrier.

3. Lock-up assembly as claimed in claim 2, wherein the piston compressing the discs is connected to an axially disposable pressure ring by an axial roller bearing ring, and the pressure ring abuts with bolts penetrating through the planet carrier on the discs, and around at least one of the bolts, a slightly pre-stressed helical spring is arranged.

4. Lock-up assembly as claimed in claim 1, wherein the cylinder is supported in the main drive housing by a support rod sealingly fixed in a side bore of the cylinder in a pre-determined position, and the side bore is perpendicular to the middle bore of the cylinder inhousing the pistons, and the support rod penetrates through the main drive housing in a sealed manner, and the support rod contains a first longitudinal bore communicating pressurised fluid into the pressure chamber between the pistons and a second longitudinal bore letting air out of the pressure chamber.

5. Lock-up assembly as claimed in claim 2, wherein the first piston is arranged around said cylindrical extension of the planet carrier by a gliding bearing and it is axially lying against the axial roller bearing ring.

6. Lock-up assembly as claimed in claim 5, wherein the second piston is lying against an outer ring of a roller bearing between the main drive housing and the planet carrier.

7. Lock-up assembly as claimed in claim 2, wherein the first piston is axially lying against the axial roller bearing ring and is sealingly disposable on an outer annular surface of the second piston, and the second piston is axially supported by an axial roller bearing assembly against an inner ring of a roller bearing between the main drive housing and the planet carrier and is radially supported by a radial roller bearing assembly against said cylindrical extension of the planet carrier, whereas said inner ring of the roller bearing is fixed against the planet carrier.

8. Lock-up assembly as claimed in any claim 7, wherein axial and radial roller surfaces for the axial roller bearing assembly and the radial roller bearing assembly, respectively, are provided on an annular member tightly fixed on the planet carrier.

* * * * *